July 7, 1925.
P. DOLAN
AUTOMATIC CLOTHESLINE REEL
Filed Jan. 24, 1925
1,545,312
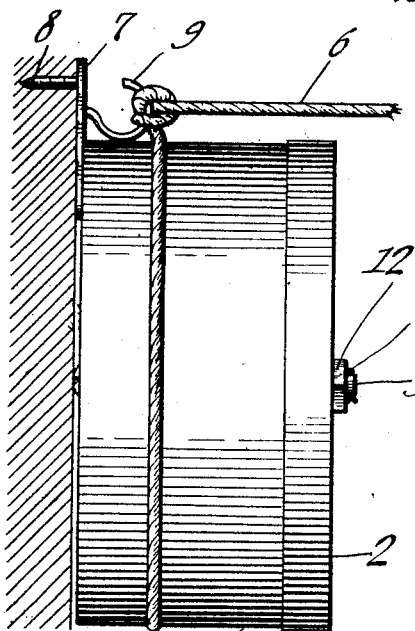
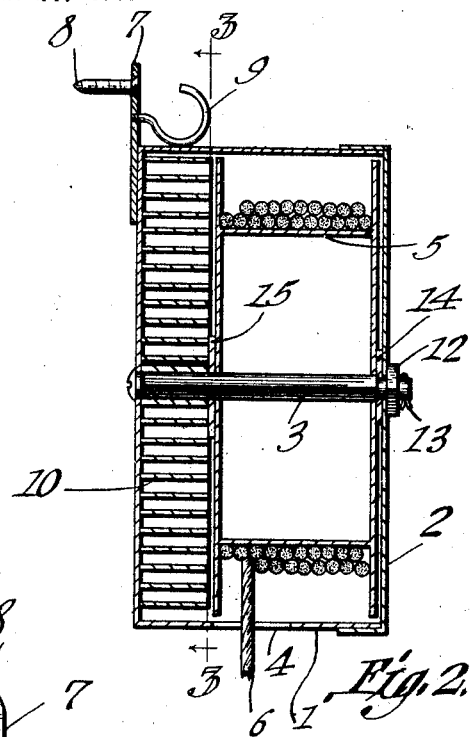
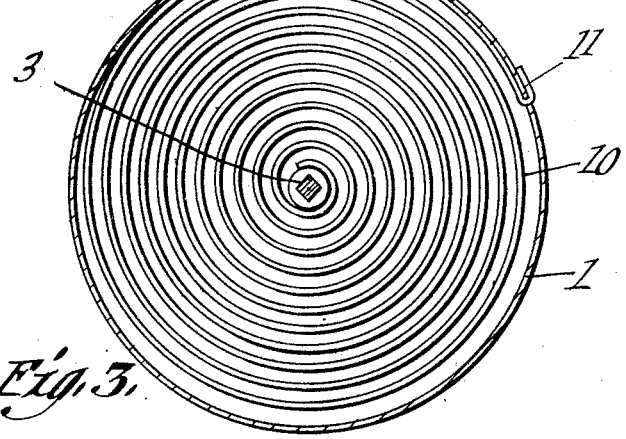
Inventor
P. Dolan
By C. A. Snow & Co.
Attorneys.

Patented July 7, 1925.

UNITED STATES PATENT OFFICE.

1,545,312

PETER DOLAN, OF CHICAGO, ILLINOIS.

AUTOMATIC CLOTHESLINE REEL.

Application filed January 24, 1925. Serial No. 4,556.

*To all whom it may concern:*

Be it known that I, PETER DOLAN, a citizen of the United States, residing at Chicago, in the county of Cook and State of Illinois, have invented a new and useful Automatic Clothesline Reel, of which the following is a specification.

This invention relates to clothes line reels of the type in which a line is wound on a spring actuated drum contained in a suitable housing or container.

The object of the invention is to provide a reel of this character in which the casing, spring and shaft are formed as a unitary structure and which is so constructed as to relieve the spring from tension when the line is in use and to prevent the line from sagging when so used.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a reel constructed in accordance with this invention shown in operative position with the line or cord secured to relieve the spring of tension;

Fig. 2 is a transverse vertical section of the reel; and

Fig. 3 is a horizontal section taken on the line 3—3 of Fig. 2.

In the embodiment illustrated a casing 1 is shown made cylindrical in form and provided with a removable cover 2, a shaft 3 which is polygonal in cross section is mounted to rotate in the rear wall of casing 1 and the cover 2 and has attached to one end thereof one end of a spiral ribbon spring 10, the other end of which is attached to the peripheral wall of the casing as shown at 11.

A drum 5 is located in the casing 1 on the shaft 3 to rotate with the shaft and is designed to have wound thereon a cord or clothes line 6 one end of which extends through an opening 4 in the side wall of the casing as is shown clearly in Fig. 2.

The rear wall of the casing 1 is equipped with a hanger 7 here shown in the form of an apertured lug or ear designed to be mounted on the wall of a room or on another support, a screw 8 being here shown for securing it. A hook 9 extends laterally from the front face of the hanger 7 and is designed to have the line 6 looped there around as shown in Fig. 1 when the line is in use and which thus relieves the spring 10 of tension and also prevents the line from sagging when it is used. A lock nut 12 is mounted on the reduced outer end of the shaft 3 as shown clearly in Fig. 2 and a cotter pin 13 is preferably used for preventing the nut from accidentally becoming disengaged. A washer 14 is shown mounted on the reduced end of shaft 3 between the end wall of the drum and the cover 2 so that the drum may be permitted to turn freely without binding against the cover. A similar washer 15 is located on the shaft between the rear wall of the drum and the front edge of the spring as is shown clearly in Fig. 2.

Owing to the fact that the spring 10 is secured to the casing instead of to the drum a much longer cord or line 6 may be used on the drum than if the spring were attached to the drum.

I claim:—

In a clothes line reel a cylindrical casing having one end closed and provided with a removable cover at its other end, a shaft mounted to rotate in the rear wall of the casing and in its cover, a spiral ribbon spring secured at one end to said shaft and at its other to the peripheral wall of the casing, a drum located in said casing and secured to said shaft to rotate therewith, a clothes line having one end secured to said drum and adapted to be wound thereon, said casing having in its peripheral wall an opening for the passing of said line therethrough, a hanger mounted on the rear wall of said casing with a hook extending laterally from its front face around which the line is designed to be looped whereby the spring is relieved of tension when the line is in use and the line also prevented from sagging.

In testimony that I claim the foregoing as my own, I have hereto affixed my signature in the presence of two witnesses.

PETER DOLAN

Witnesses:
LILLIAN M. BURKMAN,
JOHN COLLINS.